T. W. JERREMS.
FEEDING MECHANISM FOR GRASS TWINE MACHINES.
APPLICATION FILED JULY 7, 1910.
1,018,423.
Patented Feb. 27, 1912.
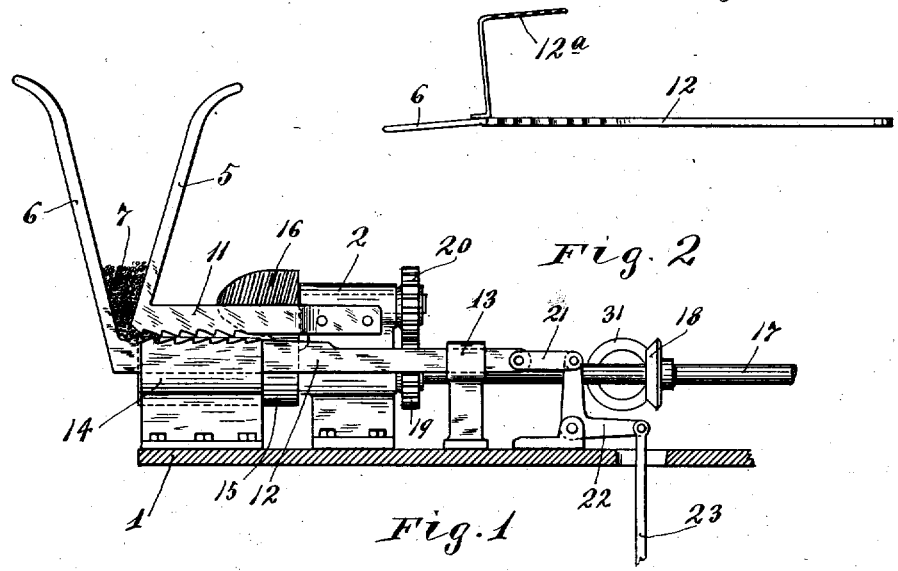
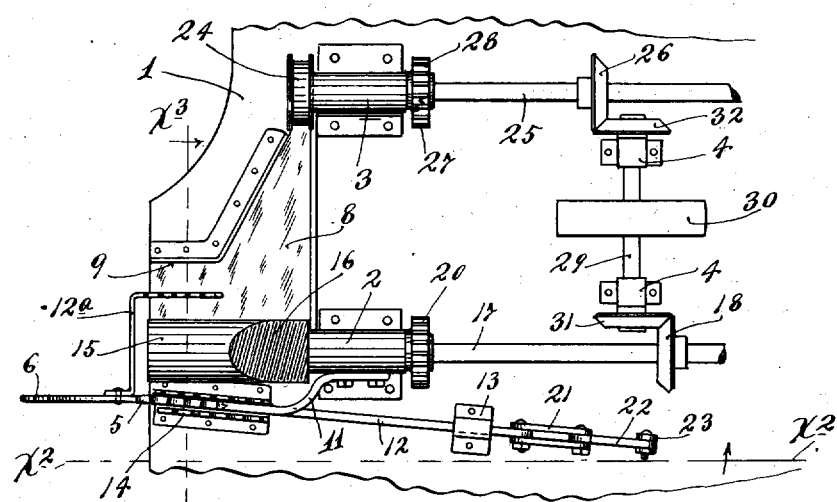
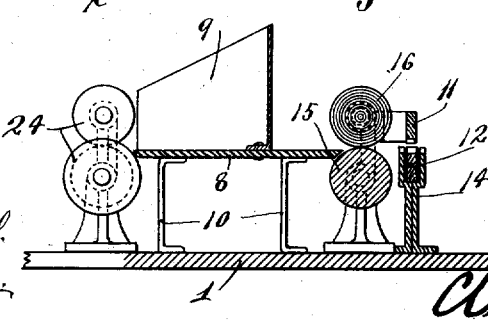
Witnesses.
A. H. Opsahl.
W. H. Souba.
Inventor.
Thomas W. Jerrems
By his Attorneys
Williamson & Merchant
COLUMBIA PLANOGRAPH CO., WASHINGTON, D. C.

UNITED STATES PATENT OFFICE.

THOMAS W. JERREMS, OF ST. PAUL, MINNESOTA, ASSIGNOR OF ONE-HALF TO EMIL H. STEIGER, OF OSHKOSH, WISCONSIN.

FEEDING MECHANISM FOR GRASS-TWINE MACHINES.

1,018,423.  Specification of Letters Patent.  Patented Feb. 27, 1912.

Application filed July 7, 1910. Serial No. 570,733.

*To all whom it may concern:*

Be it known that I, THOMAS W. JERREMS, a citizen of the United States, residing at St. Paul, in the county of Ramsey and State of Minnesota, have invented certain new and useful Improvements in Feeding Mechanism for Grass-Twine Machines; and I do hereby declare the following to be a full, clear, and exact description of the invention, such as will enable others skilled in the art to which it appertains to make and use the same.

My present invention relates to grass type machines and has for its object to provide an improved grass-feeding mechanism therefor.

The invention consists of the novel devices and combinations of devices hereinafter described and defined in the claims.

Particularly this invention relates to the improvement of the grass-feeding mechanism of the general type disclosed and claimed in my prior Patent, No. 745,625, of date December 1st, 1903, and in my later Patent, No. 824,792, of date July 3rd, 1906. As illustrated in the drawings of the last noted patent, the grass blades were, by coöperating serrated bars or members, fed laterally downward between a pair of upright feed rollers having longitudinally converging surfaces. In the present improved feed device, the serrated bars, which feed the grass blades laterally from the grass holder, are horizontally disposed and operate as a primary feed device to feed the grass blades laterally between approximately horizontal rollers which constitute a secondary feed device operating to feed the grass blades endwise. Furthermore, at least one of the serrated feed bars is arranged to reciprocate or vibrate, and is connected to one of the side members of an upwardly converging grass holder, so that the grass contained in the holder will, in rapid succession, be, first, loosened and permitted to fall and, then, squeezed or compressed, so that its initial feed between the serrated feed bars is insured.

In the accompanying drawings which illustrate the invention, like characters indicate like parts throughout the several views.

Referring to the drawings, Figure 1 is a fragmentary plan view with some parts broken away, showing the improved grass feeding mechanism; Fig. 2 is a vertical section taken approximately on the line $x^2$ $x^2$ of Fig. 1; Fig. 3 is a vertical section taken on the line $x^3$ $x^3$ of Fig. 1; and Fig. 4 is a detail in plan, showing the reciprocatory or vibratory serrated feed bar of the so-called primary feed device.

The numeral 1 indicates a bed plate, upon which are rigidly secured bearings 2, 3 and 4 and other parts hereinafter noted. The grass holder is made up of a pair of upwardly diverging bars 5 and 6 and, preferably, other coöperating devices, not shown, which are adapted to hold the grass blades 7 in a compact horizontal arrangement, with the butts of the grass blades projecting over a small table 8 and against or in close engagement with the adjacent portion of an upright guide plate 9. The said guide plate 9 is secured directly to the table 8 and the said table 8 is rigidly secured to the bed plate 1 by a post 10. The holder bar 5 is rigidly secured to the projecting end of a horizontal feed bar 11, the lower surface of which is serrated or toothed, and the inner end of which is rigidly secured, as shown, to the bearing 2. The other or movable holder bar 6 is rigidly secured to the outer end of a horizontal feed bar 12, the upper edge of which is serrated for a considerable distance inward from the lower extremity of the said bar 6. This movable feed bar 12 is arranged to slide through a bearing 13 on the bed plate 1 and in a bifurcated keeper 14, which is also rigidly secured to the bed plate 1. This keeper 14 is preferably made up of two members rigidly secured together, and having the upper edges of its sides formed with teeth or serrations, which are slightly below the teeth of the upper bar 11. The teeth on the bars 11 and 12 and on the upper edges of the bifurcated keeper 14 are all ratchet-like and arranged for coöperation to feed the grass blades laterally from the holder in a direction from the left toward the right in respect to Figs. 1 and 2. Preferably also the movable bar 12 is provided with a laterally offset supplemental feed bar 12ª, having teeth on its upper edge corresponding substantially to the teeth on the said main bar 12. The toothed bars above described constitute what is herein designated as the primary feed device and they are arranged to feed the grass blades laterally between a pair of coöperating feed rollers 15 and 16, the former of which has a shaft 17 mounted in the bearing 2 and in other bearings, not shown. This shaft 17 carries a beveled gear 18 and a spur gear 19. The shaft of the roller 16 is also mounted in the bearing 2 and it is provided with a spur gear 20 that meshes with the above noted gear 19. The lower roller 15 is preferably straight and relatively long, while the upper roller 16 is relatively short and is formed with an approximately conical point and shallow threads for action on the grass blades.

The roller construction just described is one way of forming the rollers with longitudinally diverging surfaces, which adapt the grass blades to be fed laterally between the rollers, and the threads on the roller 16 make this action more positive.

Reciprocatory movement may be imparted to the feed bar 12 by any suitable means, but, as shown, the inner end thereof is connected by a short link 21 to one arm of a bell crank 22, the other arm of which bell crank is connected to the upper end of a link 23 and receives its vibratory motion from an eccentric crank or other suitable devices, not shown. The grass blades, which are fed endwise from the rollers 15 and 16, are, as shown, delivered to and passed between a pair of coöperating rollers 24. The shaft 25 of the lower roller 24 is journaled in the bearing 3 and other bearings, not shown, and is provided with a beveled gear 26 and a spur gear 27. The shaft of the upper roller 24 is journaled in the bearing 3 and is provided with a spur gear 28 that meshes the spur gear 27 of the shaft 25.

A counter-shaft 29 journaled in the bearing 4 is provided, at its intermediate portion, with a pulley 30 and, at its ends, it is provided with beveled gears 31 and 32 that mesh respectively with the gear 18 of the shaft 17 and with the gear 26 of the shaft 25. Motion is thus imparted to the several rollers described through a power-driven belt, not shown, but which will be arranged to run over the pulley 30.

Under the vibratory movement of the feed bar 12ª, the grass blades are fed laterally from the bottom of the grass holder along the upper surface of the table 8 and between the opposing teeth of the upper bar 11 and the lower bars or toothed plates afforded by the upper portions of the keeper 14. In this way, the grass blades are fed laterally between the rollers 15 and 16 and, when they are tightly pressed by the said rollers, the grass blades will be fed endwise to and between the rollers or draw wheels 24 and, by the latter, they will be fed to the grass forming mechanism proper, not shown, but which may be of any suitable construction.

The butt ends of the grass, as they are fed forward by the feed rollers 15 and 16, are, by the table 8 and the oblique portion of the plate 9, guided between the draw rollers or wheels 24.

It is important to note that the toothed portions of the bar 12 and the supplemental bar 12ª engage the grass blades at points on opposite sides of the rollers 15 and 16, which insures a truer and better lateral delivery of the grass blades to the rollers 15 and 16 of the so-called secondary feed device. The lateral movement of the holder bar 6, in respect to the bar 5, serves to continuously expand and contract the holder, and, by alternately squeezing and loosening the grass blades, insures the proper downward feed thereof in the holder and from the bottom of the holder between the teeth of the feed bars.

What I claim is:

1. A grass feeding mechanism comprising coöperating approximately horizontal feeding rollers adapted to receive the grass blades delivered laterally thereto and to feed the same endwise, and means for feeding the grass blades laterally to said rollers, comprising approximately horizontal feed bars, and means for reciprocating one of said feed bars in respect to the other, said bars having serrated edges and upwardly diverging arms, which arms afford a grass-holder and serve to direct the grass blades between the said feed bars.

2. In a grass-feeding mechanism, the combination with feed bars having opposing serrated edges and provided with upwardly extended arms adapted to hold the grass blades and delivering the same between the serrated edges of said bars, means for reciprocating the lower bar, and a keeper for said lower bar having laterally spaced side flanges with serrated upper edges coöperating with the serrated edges of said bar.

3. In a grass-feeding mechanism, the combination with approximately horizontal feed rollers adapted to receive the grass blades delivered laterally thereto and to feed the same endwise, of means for feeding said grass blades laterally to said rollers, comprising approximately horizontal serrated bars and means for reciprocating one of said bars in respect to the other, the said serrated bars being located on one side of said rollers and a supplemental serrated bar being located on the opposite side of said rollers and secured to the movable member of said first noted serrated bars.

4. In a grass-feeding mechanism, the combination with a relatively long approximately horizontal feed roller and a coöperating reversely driven endwise tapered and threaded upper roller, of means for feeding the grass blades laterally between and to said feed rollers, comprising upper and lower main feed bars having coöperating serrated edges and provided with upwardly diverging arms adapted to hold the grass blades and deliver the same between the serrated edges of said bars, means for reciprocating the lower feed bar, the said feed bars being located on one side of said feed rollers, and a supplemental feed bar being located on the opposite side of said feed rollers and secured to the lower movable main feed bar.

In testimony whereof I affix my signature in presence of two witnesses.

THOMAS W. JERREMS.

Witnesses:
LORA G. HOFFMAN,
HARRY D. KILGORE.

Copies of this patent may be obtained for five cents each, by addressing the "Commissioner of Patents, Washington, D. C."